April 4, 1967  E. A. DE VOSS  3,312,382
HOLE LOCATING AND RIVET POSITIONING MEANS
Filed June 28, 1965  4 Sheets-Sheet 1
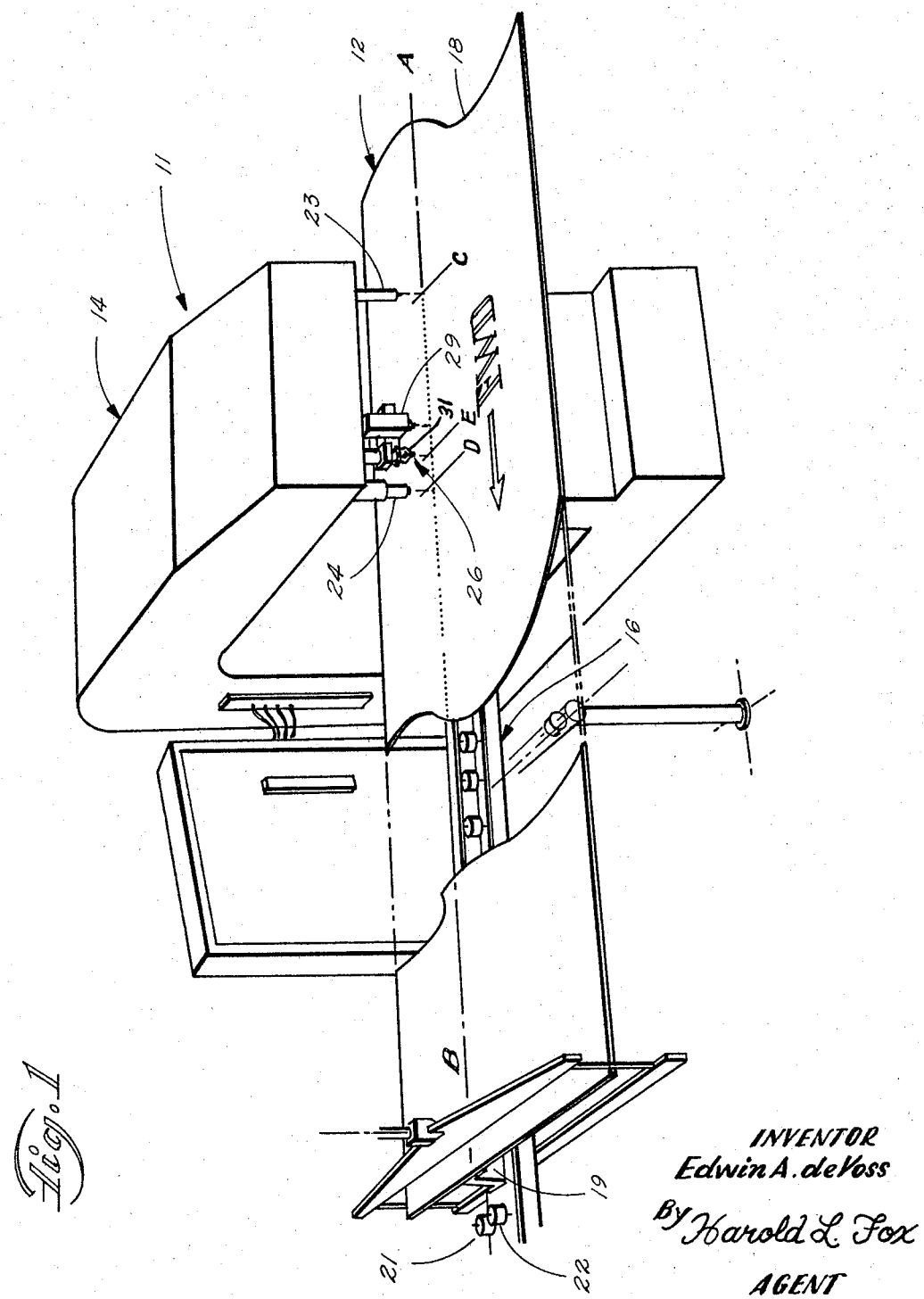
INVENTOR
Edwin A. de Voss
By Harold L. Fox
AGENT April 4, 1967    E. A. DE VOSS    3,312,382
HOLE LOCATING AND RIVET POSITIONING MEANS
Filed June 28, 1965    4 Sheets-Sheet 2
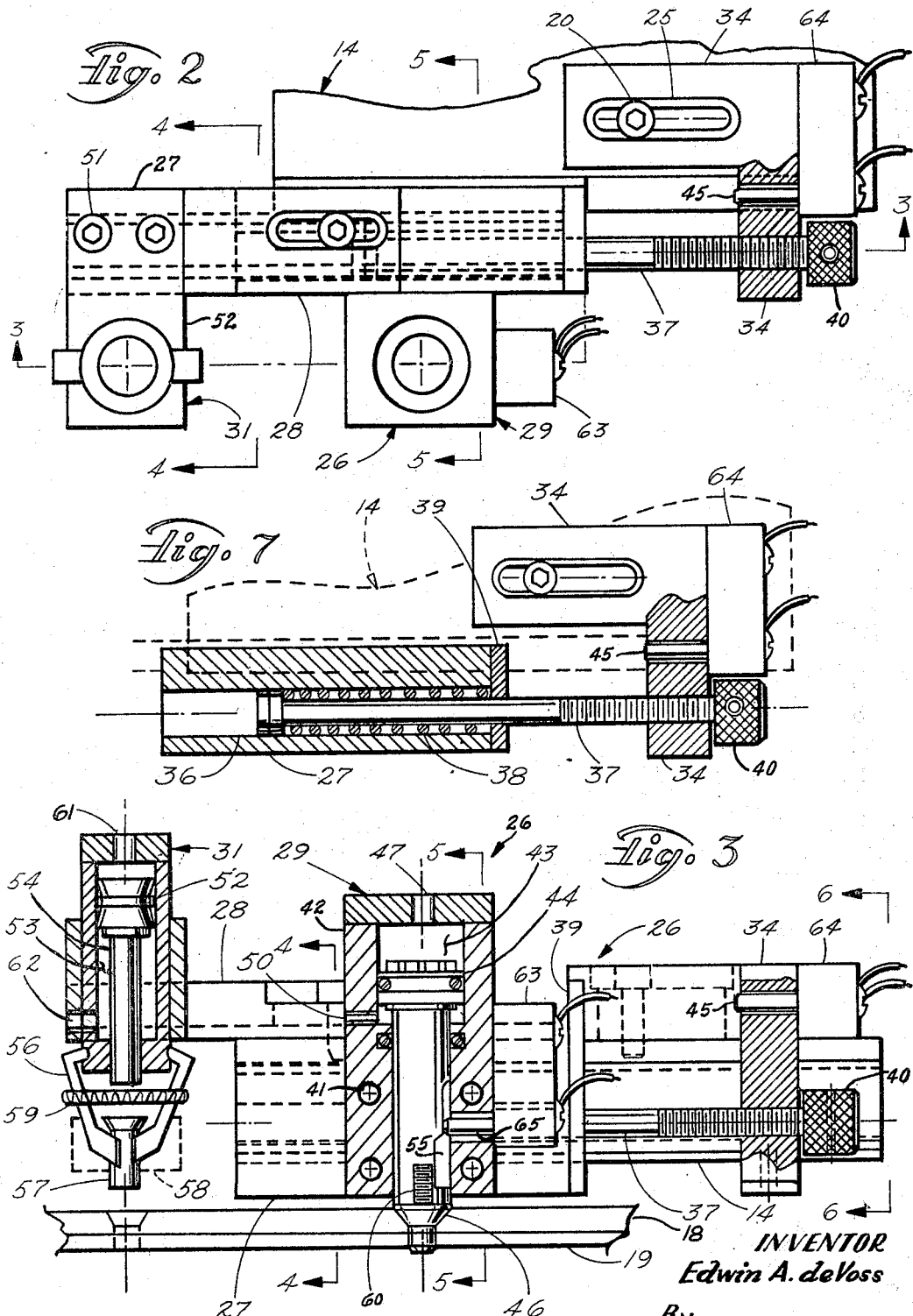
INVENTOR
Edwin A. deVoss
By Harold L. Fox
AGENT

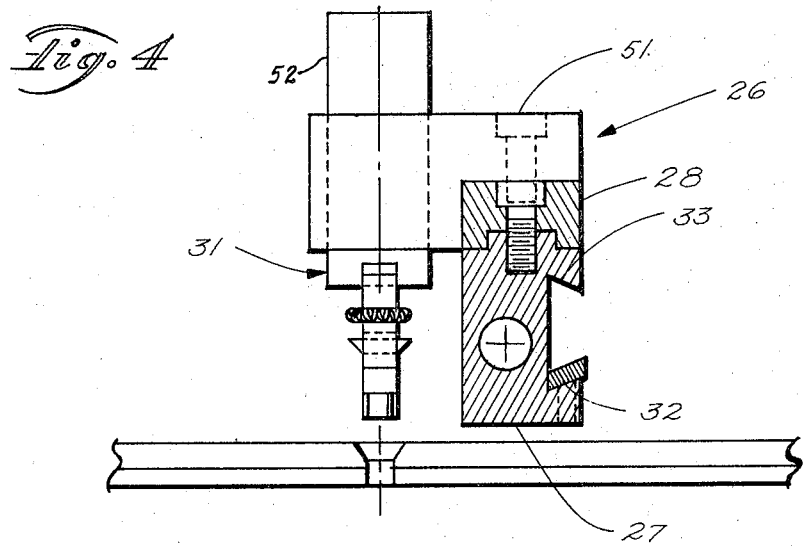
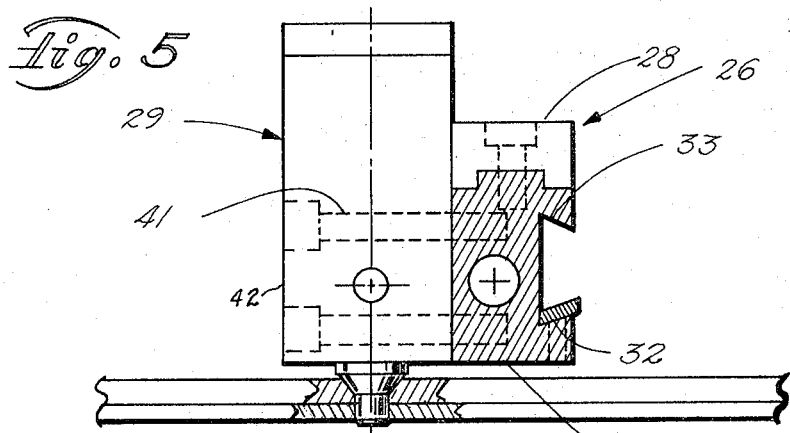
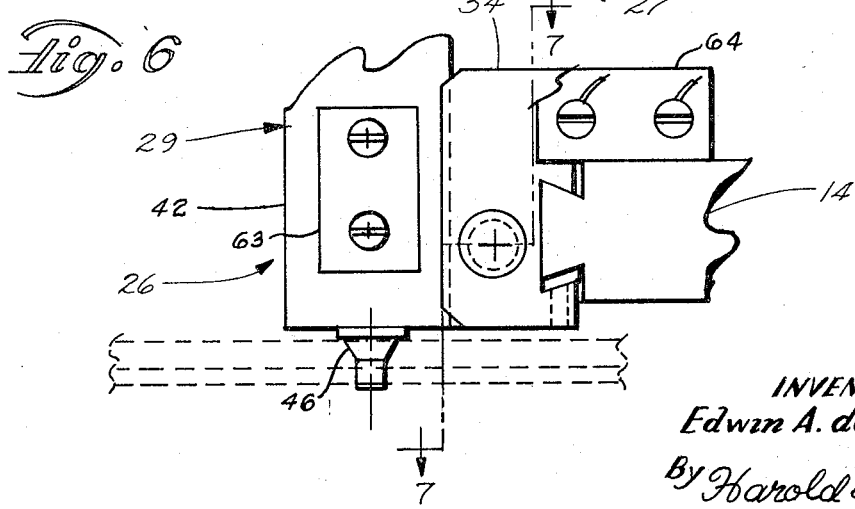

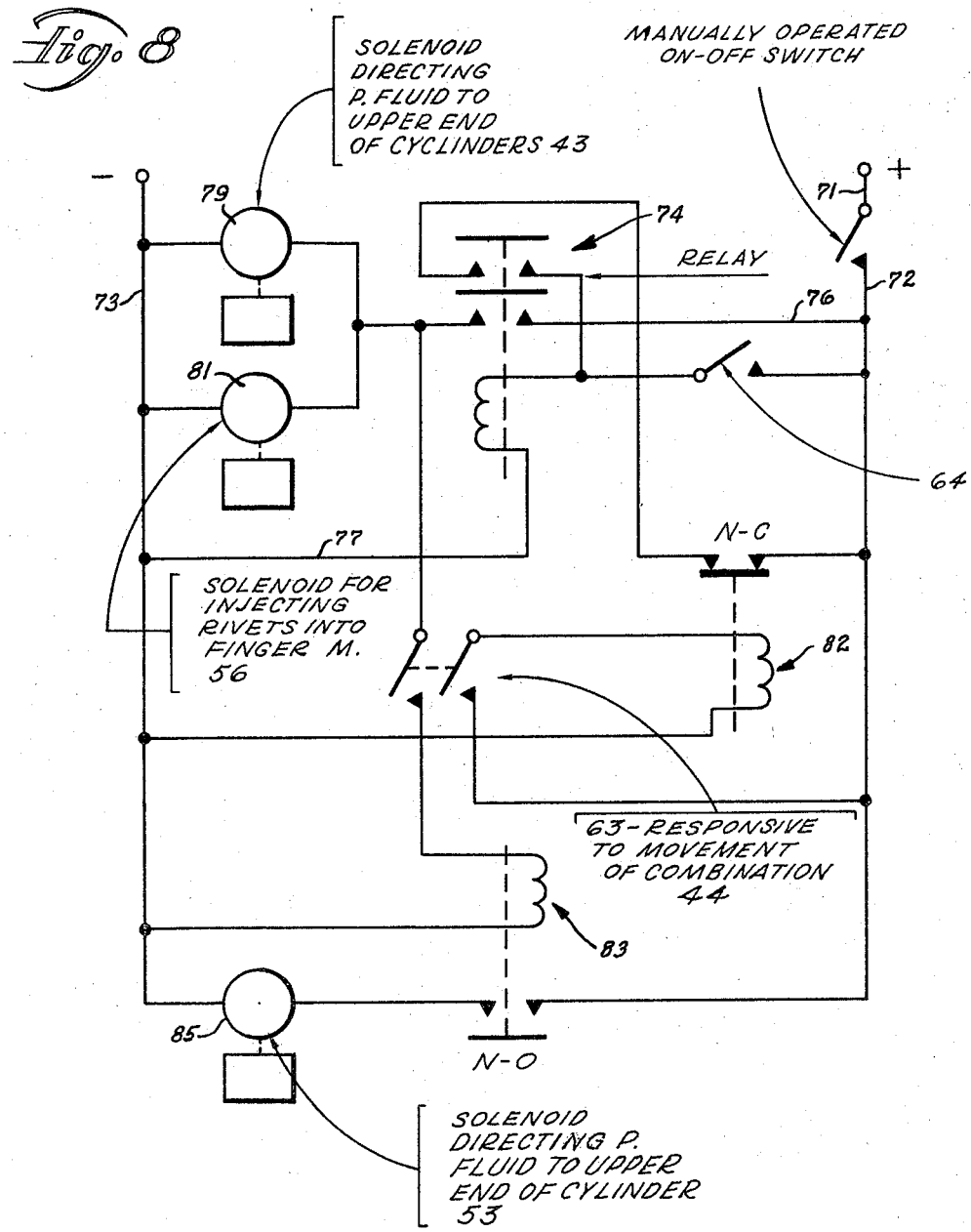

United States Patent Office 3,312,382
Patented Apr. 4, 1967

3,312,382
HOLE LOCATING AND RIVET POSITIONING MEANS
Edwin A. de Voss, Torrance, Calif., assignor to Northrop Corporation, Beverly Hills, Calif., a corporation of California
Filed June 28, 1965, Ser. No. 467,656
3 Claims. (Cl. 227—73)

This invention pertains to a device having utility in a fabrication operation and more particularly to an improvement in automatic equipment functioning to fabricate plate-like panel assemblies utilizing rivets as securing means, the subject improvement functioning to locate and position rivets in holes previously drilled by the drilling head of the assembly.

In the fabrication of panel assemblies (particularly assemblies for aircraft) it frequently becomes necessary to allow considerable distances between the drilling head of an automatic drilling and riveting machine and the position at which a rivet is subsequently inserted into a previously drilled hole, this condition provides sufficient time and space enabling numerous auxiliary operations to be effected. For example, frequently it becomes necessary to apply a protective coating to the surfaces defining newly drilled holes utilizing a liquid agent for this purpose, in fact it may be necessary to add two or more applications to the surfaces of such holes and in turn allow sufficient time for the agent to cure or dry. Thus, it becomes apparent that considerable time (distance) must be provided between the drilling head of an automatic machine and the position at which a rivet is subsequently inserted into a previously drilled hole. An effective and practical manner of effecting this time interval is to increase the distance between the position at which a drilling operation is effected and the position at which a rivet inserting operation occurs.

Referring particularly to panel assemblies for aircraft, holes drilled in these assemblies are normally countersunk to receive flush headed rivets. Thus rivets positioned in holes of this type by positioning means having a fixed relation relative to the machine's drilling head normally would find their way into these holes, however, the surfaces thereof would unquestionably be scratched, marred or otherwise defaced in the operation. This condition (defacing the surfaces defining the subject holes) can not be tolerated for reasons well known to those familiar with the art.

Assuming that a rivet positioning means has a fixed relation with respect to the drilling head of an automatic machine and further that an accumulative error (either positive or negative) of five thousandths of an inch (.0") occurs each time a hole is drilled in a plate-like assembly. Under these conditions it becomes apparent that an accumulated error of one hundredth of an inch (.010") will occur in twenty spaces (spaces between twenty-one rivets). In other words if fixed positioning means is utilized a rivet will not be aligned with a previously drilled hole, for example—a hole drilled twenty (20) spaces earlier. A rivet will not necassarily have a concentric relation with a particular hole and can not be inserted in the subject hole without defacing the surface thereof.

It is an object of the present invention to disclose an attachment for automatic drilling and riveting machines, the machines functioning to fabricate plate-like panel assemblies and the attachment functioning to insure substantially a concentric relation between a rivet and a particular hole regardless of the distance between the location of the rivet inserting operation and the location at which the hole was initially drilled.

Although the characteristic features of the present invention are particularly pointed out in the appended claims, the invention ittself, also the manner in which it may be carried out, will be better understood by referring to the following description taken in connection with the accompanying drawings forming a part of this application and in which:

FIGURE 1 is a perspective view of an automatic drilling and riveting machine embodying a hole locating and rivet positioning device as disclosed herein.

FIGURE 2 is an enlarged fragmentary view of the machine of FIGURE 1 showing in plan the hole locating and rivet positioning device of FIGURE 1 and the manner in which the latter is mounted on the machine of FIGURE 1.

FIGURE 3 is a sectional view of the hole locating and rivet positioning means taken on the line 3—3 of FIGURE 2.

FIGURES 4 and 5 are sectional views of the hole locating and rivet positioning device taken on the lines 4—4 and 5—5, respectively, of FIGURE 2.

FIGURE 6 is an end elevational view of the hole locating and rivet positioning device as indicated by the arrows 6—6 of FIGURE 3.

FIGURE 7 is a sectional view of the hole locating and rivet positioning device taken on the line 7—7 FIGURE 6.

FIGURE 8 is a schematic view of an electrical circuit adapted to operate the hole locating rivet and position device of FIGURES 2-7, inclusive.

Referring to the drawings and particularly to FIGURE 1, here equipment adapted to fabricate plate-like panel assemblies is shown—the equipment indicated in its entirety by the numeral 11. The equipment includes an automatic drilling and riveting machine 14, support and guiding means 16 and advancing means (not shown). In the present embodiment a panel assembly 12 is shown as being fabricated by the equipment 11, the assembly 12 being a component usable in the construction of an aircraft and including sheet and stringer members 18 and 19, respectively.

The equipment 11 is automatic in its operation or substantially so. During fabrication the assembly 12 is supported on the means 16 and directed thereby under the working heads of the machine 14 by opposed rollers 21 and 22 which embrace the stringer member 19. The assembly 12 is incrementally advanced from right to left as viewed in FIGURE 1, movement is imparted to the assembly 12 by the aforementioned advancing means or means similar in operation to that shown in copending application Ser. No. 470,793.

The machine 14 includes drilling and riveting heads 23 and 24, respectively, fixedly mounted in spaced relation on the frame of the machine 14, also slidably mounted on the frame of the machine 14—at a location between the heads 23 and 24—is the hole locating and rivet position means 26 as disclosed herein. It will be understood that hydraulically operated anvils (not shown) oppose the heads 23 and 24 and provide firm support (locally) for the sheet 18, stringer 19 and heads 23 and 24 at such time as the latter are effecting drilling and riveting operations. Referring further to FIGURE 1 it will also be seen that the spacing between the heads 23 and 24 is considerable for reasons previously explained.

Referring now to FIGURES 3–6, inclusive, the hole locating and rivet position means 26, also the relation thereof with respect to the machine 14, will now be described. The means 26 includes primary and secondary mounting members 27 and 28, respectively, a hole locating assembly 29 and a rivet positioning assembly 31. The primary member 27 is mounted by means of ways 32 which are received on horizontal ways 33 for slidable movement thereon, the ways 33 constituting integral portions of the frame of the machine 14. In turn the secondary member 28 is mounted on the horizontal slide 27 for movement thereon as best seen in FIGURES 2-5, inclusive. The hole locating assembly 29 is fixedly secured to the member 27 while the rivet positioning assembly 31 is fixedly secured to the member 28.

Referring particularly to FIGURES 2, 3 and 7, a bracket member 34 is adjustably mounted on the structure 14 and functions to limit movement of the member 27 to the right. Adjustment of the member 34 is provided by a cap screw 20 threadably engaging the structure 14 and extending through a groove 25 provided in the member 34, the adjustable feature of the member 34 enables the latter to function in a manner that will become apparent as the disclosure progresses. A bore 36 is provided in and extends throughout the length of the member 27, mounted in the bore 36 is a plunger member 37 having a spring 38 surrounding a portion thereof substantially as shown in FIGURE 7. The spring 38 is maintained in the bore 36 in a compressed state by a plate 39 having an aperture therein, the threaded outer end portion of the shank of member 37 engaging threads provided in a nut 40. The exposed end of the member 37 carries a knurled nut 40 whereby rotational movement may be imparted to the member 37. Thus it will be seen that at such time as an external force is not acting on the member 27 the same will abut the member 34 due to the action of the spring 38.

Referring now to FIGURES 2, 3, 5 and 6, as previously mentioned the hole locating assembly 29 is fixedly secured to the primary member 27, socket head cap screws 41 are used for this purpose (FIGURE 5). The assembly 29 includes a block member 42 the upper end of which defines a cylindrical chamber 43 having a piston-piston rod combination 44 mounted therein.

The lower (terminal) end member 46 of the rod member of the combination 44 is not an integral portion thereof, rather it (member 46) constitutes a separate component constructed of nylon or other phenolic material and is threadedly received in the terminal end of the rod member of the combination 44 as indicated in FIGURE 3. The terminal end of the member 46 has a configuration identical with the holes to be drilled and countersunk in the sheet 18 of the assembly 12.

Thus, for reasons that will be apparent presently, it should be understood that the member 46 may be replaced with a similar member of slightly different configuration adapted to enter holes being drilled or to be drilled at other times in the sheet 18. Pressure fluid for actuating combination 44 is admitted to the chamber 43 through ports 47 and 50.

The rivet positioning assembly 31 is secured to the secondary mounting member 28 by cap screws 51. The assembly 31 includes a block member 52 defining a cylindrical chamber 53. Mounted in the chamber 53 is a piston-piston rod combination 54. Mounted on the lower end of member 52 are finger members 56 adapted to receive and hold a rivet 57, the rivet 57 is fed into the finger members 56 at predetermined times from a magazine (not shown) via track means 58. The finger members 56 are held together (rivet receiving position) by a coil spring 59 which encircles the finger members. Pressurized fluid for actuating the assembly 31 is admitted to the cylindrical chamber 53 through ports 61 and 62. In view of the above discussion it will be seen that a rivet 57, positioned in the finger members 56, will be urged therefrom at such time as the rod member of the combination 54 is actuated in a downward direction.

Referring to FIGURES 2, 3 and 7 it will be seen that micro-switches 63 and 64 are mounted on the sides of the assembly 29 and bracket member 34, respectively. As mounted the actuator member 45 of the switch 64 passes through an aperture provided in member 34 and extends slightly beyond the inner surface thereof. Thus it will be seen that actuation of the switch 64 is responsive to the position of the primary member 27. The actuator member 65 of the switch 63 extends through an aperture provided in the wall of the member 42 and into a stepped depression 55 in the rod of piston-piston rod combination 44. Thus it will be seen the switch 63 is responsive to movement of the rod of the combination 44. The switches 63 and 64 functioning to control the flow of fluid to and from the assemblies 29 and 31 during the operation of the hole locating and rivet positioning means 26.

An understanding of the manner in which the machine 14, means 16 and the aforementioned advancing means cooperate in fabricating the assembly 12 will be forthcoming from the following brief description of operation, a more complete understanding of the advancing means adapted to advance the assembly 12 under the heads 23 and 24 of the machine 14 will be obtained by referring to our aforementioned copending application Ser. No. 470,493. In view of the above background a better understanding of the construction and operation of the hole locating and rivet positioning means 26 will be forthcoming from the following detailed description of its operation and cooperation with other parts of the facility 11.

In view of the above it will be understood that the assembly 12 is incrementally moved (advanced) in a straight line under the heads 23 and 24 as indicated by the line A—B in FIGURE 1. Assuming there are thirty (30) holes effected between the time a subject hole is drilled by the head 23 and a rivet subsequently positioned in the hole and the riveting operation effected under the head 24, a delay occurs indicated by the portion C—D of the line A—B. It is also assumed that a delay of at least twenty-one holes (twenty spaces), between the time the subject hole is drilled by the head 23 and the time a rivet is positioned therein by the means 26, indicated by the portion C—E of the line A—B. In other words, if a positive error (continuously in one direction) of five thousandths (.005″) of an inch occurs each time a hole is drilled, it will be apparent that an accumulated error of one hundredth of an inch will occur between the time a rivet is to be positioned at the time the subject hole is drilled. The result will be a maring or defacing of the subject hole as well as scoring or scratching of the rivet, it is this defacing of a hole and scoring of the rivet that the means 26 eliminates.

Manual adjustments of the assembly 31 on the member 27 may be required prior to the drilling of a first hole, also in all probability before the beginning of a second and subsequent hole drilling operations, to initially allow for hole location and differences in spacing (pitch) between holes. For example—referring to FIGURES 2 and 3—the bracket member 34 is adjusted on the structure 14 so that the center line of the assembly 29 will be positioned between two adjacent holes at such time as member 27 is bottomed on the member 34.

As the member 27 is bottomed on the member 34 the electrical circuit (FIGURE 8) functions to direct pressurized fluid through the conduit 47 to the upper end of chamber 43. The electrical circuit shown in FIGURE 8 is conventional representing only one of a plurality of circuits which would function to port fluid to the cylinders 43 and 53. In view of the fact that the circuit just referred to is quite conventional and is referred to in the claims merely as means, a description thereof is not deemed necessary.

With pressurized fluid acting downwardly on the piston of the combination 44 the end member 46 is urged into contact with the upper surface of the sheet 18. As the assembly 12 is advanced to the left the member 46 will be urged into the first hole moved thereunder, i.e., the hole previously located to the right of the member 46.

The above action (viz., the stepped depression 55 actuates the switch 63 which in turn actuates a fluid valve (not shown)) ports pressurized liquid through the port 61 to the top of cylinder 53. Accordingly, a rivet 57 positioned in the finger members 56 will be urged into a hole preceding the hole entered by member 46. Full down action of the rod of the combination 54 actuates a switch 85 (FIGURE 8) resulting in pressurized fluid being admitted to the lower ends of the cylinders 43 and 53 resulting in the rods of the combinations 44 and 54 retracting as described in connection with the operation of the equipment 11.

The spring 38, the latter having been compressed by movement of the assembly 12 (due to the fact that the member 46 is positioned in a hole in the assembly 12), now takes over returning the member 27 to its initial position in which it abuts member 34. The operation described above is now repeated. Thus it will be seen that the means 26 functions effectively to position rivets in holes without scoring the rivets or defacing the surfaces defining the holes regardless of the location thereof with respect to the location at which the holes are drilled.

The various components of the hole locating and rivet positioning means 26 having been described a better understanding of construction thereof and its cooperation with the machine 14 will be forthcoming from the following description of operation of the means 26 considered in connection with the electrical circuit of FIGURE 8.

At the start of a fabrication operation on the assembly 12, it is assumed that the member 46 is located between adjacent aligned holes in the sheet 18. Electrical current for operating the means 26 is made available through the connectors 72 and 73 by closing the manually operated switch 71.

At this time the plate 39 has an abutting relation with the bracket 34 and accordingly the switch 64 (FIGURE 8) is closed. Thus the coil of the relay 74 is energized and its contacts points closed. Accordingly circuits embracing solenoids of the devices 79 and 81 (FIGURE 8), controlling the flow of pressurized fluid to the upper end of the cylinder 43 and for feeding a rivet into the fingers 56, respectively, is energized. Thus pressurized fluid is admitted to the upper end of the cylinder 43 and a rivet is fed into the fingers 56 by operation of the mechanisms 79 and 81, respectively.

Accordingly the combination 44 is forced downward with the member 46 contacting and resting on the sheet 18. As the sheet 18 is advanced (as described in copending application, Serial No. 470,293) the member 46 is urged into the first hole of a series of aligned holes—for example, the first hole of the line A—A. This action allows a portion of the rod of combination 44 (defining the stepped depression 55) to contact the plunger 65 of the switch 63 and activate it.

Thus switch 63 is closed simultaneously resulting in energizing the coils of relays 82 and 83 and the opening of the contact points of the relay 82 and the closing of contact points of the relay 83. Thus the operating mechanism 85 is actuated to admit pressurized fluid to the upper end of cylinder 53 and the rivet, previously positioned in the fingers 56, is urged into an aligned hole.

As the combination 54 reaches the lower end of its stroke, the rod of combination 54 contacts a limit switch (not shown) deenergizing relays 74 and 83 thereby allowing spring means to return the actuating mechanism 61 and 79 to their original positions whereby pressurized fluid is admitted to the lower ends of cylinders 43 and 53 causing combinations 44 and 54 to return to the up positions.

The means 26 now returns to its initial position, in which the plate 39 abuts the bracket 34, and the operation repeated.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore clamied in any of its forms or modifications within the legitimate and valid scop of the appended claims.

I claim:
1. The combination with a facility adapted to fabricate plate-like assemblies utilizing rivets including a frame member constituting fixed structure, a drilling head and means adapted to impart uni-directional incremental movement to the assembly during which time a plurality of equally spaced holes are drilled in the straight line in the continuously moving assembly of a hole locating and rivet positioning means, comprising:
   (a) mounting means slidably mounted on the frame of the facility for reciprocal movement;
   (b) a first housing means fixedly mounted on said mounting means;
   (c) said first housing means defining a cylindrical cylinder having a first piston-piston rod combination mounted therein for movement between extended and retracted positions;
   (d) the piston rod of said first combination having a free end adapted to be urged into a specific one of the plurality of holes at such time as said first combination is actuated;
   (e) second housing means adjustably mounted on said mounting means in spaced relation with respect to said first housing means and carrying resiliently pressed rivet retaining finger means;
   (f) said second housing means defining a cylindrical chamber having a second piston-piston rod combination mounted therein for movement between extended and retracted positions;
   (g) the piston rod of said second combination having a free end adapted to urge a rivet from said finger means and into another one of the plurality of holes at such times as said second combination is actuated to its extended position;
   (h) and a control system responsive to positions of said first and second housing means and respective piston-piston rod combination mounted therein whereby pressurized fluid is ported to the chamber defined by said first and second housing means to effect entry of said first piston rod into a first hole in the work followed by insertion of a rivet into a second adjacent hole in the work by said second piston rod.

2. The combination as set forth in claim 1:
   (a) including stop means mounted on the frame of the facility functioning to arrest movement of said mounting means in one direction;
   (b) and said mounting means including means adapted to return said mounting means to a position against said stop means.

3. The combination as set forth in claim 2:
   (a) in which the terminal portion of the free end of the piston rod of said first combination constitutes a separate member constructed of a material softer than the material of which the assembly is constructed.

No references cited.

GRANVILLE Y. CUSTER, JR., *Primary Examiner.*